(12) United States Patent
Kury

(10) Patent No.: US 9,625,072 B2
(45) Date of Patent: Apr. 18, 2017

(54) HOSE CONNECTION ARRANGEMENT

(75) Inventor: Werner Kury, Mullheim (DE)

(73) Assignee: NEOPERL GMBH, Mullheim (DE)

( * ) Notice: Subject to any disclaimer, the term of this patent is extended or adjusted under 35 U.S.C. 154(b) by 7 days.

(21) Appl. No.: 14/117,177

(22) PCT Filed: Dec. 23, 2011

(86) PCT No.: PCT/EP2011/006557
§ 371 (c)(1),
(2), (4) Date: Nov. 12, 2013

(87) PCT Pub. No.: WO2012/155943
PCT Pub. Date: Nov. 22, 2012

(65) Prior Publication Data
US 2014/0326352 A1 Nov. 6, 2014

(30) Foreign Application Priority Data
May 17, 2011 (DE) .................... 20 2011 100 788 U

(51) Int. Cl.
*F16L 11/00* (2006.01)
*F16L 33/22* (2006.01)
*F16L 33/207* (2006.01)

(52) U.S. Cl.
CPC ............... *F16L 33/22* (2013.01); *F16L 11/00* (2013.01); *F16L 33/2071* (2013.01)

(58) Field of Classification Search
CPC . F16L 33/2071; F16L 33/2076; F16L 33/222; F16L 33/207; F16L 33/20; F16L 11/00; F16L 33/22
See application file for complete search history.

(56) References Cited

U.S. PATENT DOCUMENTS

| 2,002,839 | A | * | 5/1935 | Stecher | .................. 285/256 |
| 4,303,263 | A | | 12/1981 | Legris | |
| 4,660,867 | A | * | 4/1987 | Kemper et al. | ............... 285/256 |
| 4,863,197 | A | * | 9/1989 | Munoz | ............... 285/14 |
| 2006/0112534 | A1 | * | 6/2006 | Seton-Anderson | ............... 29/508 |

FOREIGN PATENT DOCUMENTS

| DE | 2332528 A1 * | 1/1975 | ............ F16L 33/207 |
| DE | 2907813 | 9/1980 | |
| DE | 3909899 A1 * | 9/1990 | ............. F16L 33/20 |
| DE | 10130858 A1 * | 1/2003 | ............. F16L 47/04 |

* cited by examiner

*Primary Examiner* — David E Sosnowski
*Assistant Examiner* — James A Linford
(74) *Attorney, Agent, or Firm* — Volpe and Koenig, P.C.

(57) ABSTRACT

In a hose arrangement (1) for a water-conveying system, which arrangement includes a flexible pressure hose (2) and a connection piece (4) with a hose nipple (5) and a ferrule (6) which receive the pressure hose (2) therebetween, it is provided that the ferrule (6) has an inwardly protruding projection (12) in a ferrule section (11) projecting axially beyond the hose nipple (5), by which projection the pressure hose (2) is displaced radially inwardly behind the hose nipple (5) to form a constriction (19) of the inside diameter such that a transition of the inside diameter between the hose nipple (5) and the pressure hose (2) is smoothed.

9 Claims, 2 Drawing Sheets

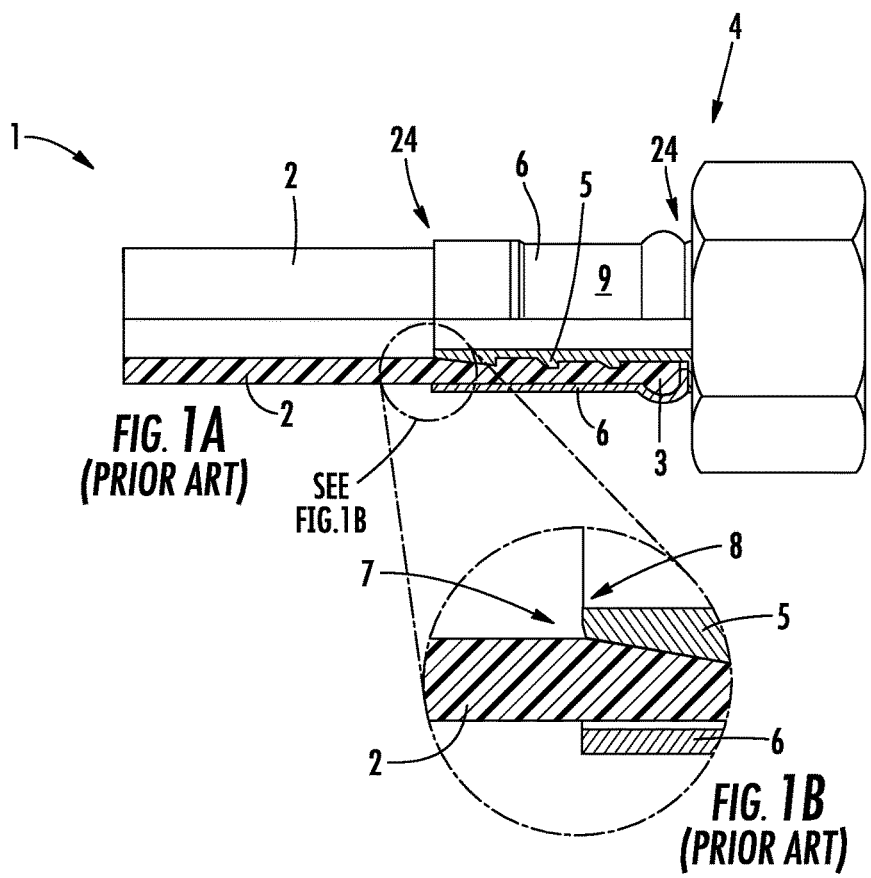
FIG. 1A (PRIOR ART)
FIG. 1B (PRIOR ART)
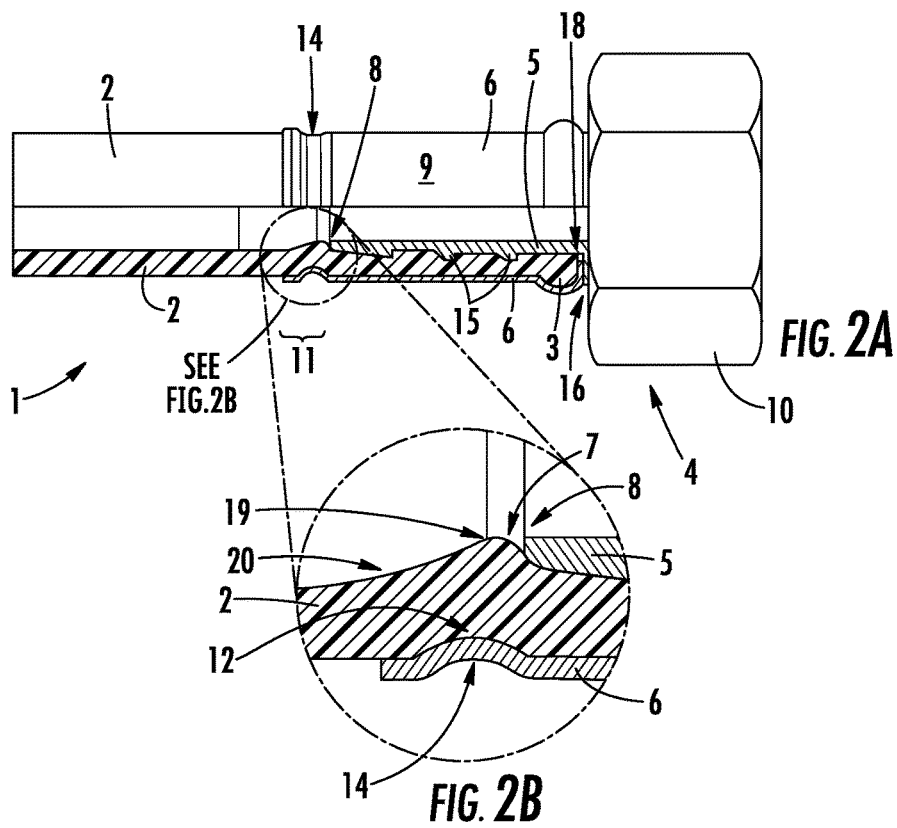
FIG. 2A
FIG. 2B

HOSE CONNECTION ARRANGEMENT

BACKGROUND

The invention relates to a hose arrangement for a water-conveying system, having a flexible pressure hose and a connection piece arranged on one hose end of the pressure hose, wherein the connection piece has at least one hose nipple which engages in the pressure hose, and a ferrule which engages around the outside of the pressure hose, and wherein the pressure hose is held in a force- and/or form-fitting manner between the hose nipple and the ferrule, wherein the ferrule projects beyond the hose nipple by way of a sleeve portion at the hose-side nipple end of said nipple in the direction of extent of the pressure hose, and wherein the ferrule forms, in the sleeve portion, a radially inwardly directed protrusion which acts radially on and displaces the pressure hose such that, compared with the clear inside diameter of the relaxed pressure hose, the clear inside diameter of the pressure hose in the region of the sleeve portion is close to or equal to the clear inside diameter of the hose nipple.

Hose arrangements of this kind are known and have frequently proved successful when used in pressurized, water-conveying systems. The designation "fitting" is also common for the hose nipple, while the designation "crimp sleeve" is also used for the ferrule when the pressure hose is held on the hose nipple by crimping of the ferrule.

A quick coupling for connecting a fluid line to a multi-layer flexible hose line is previously known from U.S. Pat. No. 4,303,263. The previously known quick coupling has a coupling part having an insertion opening coaxial with the flow line. Inserted in this insertion opening is an insert which carries a hose nipple in its end region remote from the coupling part, it being possible to push the one hose end of the multi-layer flexible hose onto said hose nipple. The coupling part has an external thread, onto which a sleeve-like coupling collar having an internal thread can be screwed. Provided in the coupling collar is a holding ring, the ring opening of which widens conically in the direction of the coupling part such that when the coupling collar is pushed onto the coupling part, the hose line gripped at the inner circumference of the holding ring is likewise pushed onto the hose nipple with its hose end increasing in size and is held there in a secured manner.

The quick coupling previously known from U.S. Pat. No. 4,303,263 allows the, if required also rapidly, releasable connection of the hose end of a flexible hose line to the hose nipple of the quick coupling, since, in the case of the previously known quick coupling, a crimpable ferrule is dispensed with. However, a disadvantage is the complex structure of this quick coupling, with its many coordinated constituent parts, resulting in a correspondingly high weight and large diameter of the quick coupling. However, compact hose arrangements which have a simple structure and are correspondingly space-saving are frequently preferred in sanitary hose lines, said hose arrangements also allowing use in confined space conditions, for example on the underside of a wash basin in the region of the fastening of the sanitary outlet fitting.

A hose arrangement of the type mentioned at the beginning is already known from DE 29 07 813 A1, said hose arrangement being provided as a high-pressure hose fitting. The previously known hose arrangement has a flexible pressure hose and a connection piece which is arranged on one hose end of the pressure hose. Provided on the connection piece is a hose nipple which engages in the hose end of the pressure hose. The pressure hose is held between the hose nipple and the ferrule in a force- and form-fitting manner, said ferrule engaging around the outside of the pressure hose. The ferrule projects beyond the hose nipple by way of a sleeve portion at the hose side nipple end of said nipple in the direction of extent of the pressure hose. On its sleeve inner circumference, the ferrule has a large number of spaced apart and annularly encircling protrusions which, in the manner of a barb, allow the hose end only to be pushed on into the intermediate space formed between the ferrule and the hose nipple, but oppose any removal of the hose end from this intermediate space. These protrusions, which are provided on the ferrule also in the region of the projecting sleeve portion, form radially inwardly directed formations which act radially on the pressure hose over the longitudinal extent thereof and displace it such that, compared with the clear inside diameter of the relaxed pressure hose, the clear inside diameter of the pressure hose in the region of the sleeve portion is close to or equal to the clear inside diameter of the hose nipple.

The high-pressure hose fitting previously known from DE 29 07 813 A1 presupposes a comparatively thick pressure hose made of elastic material, which is able, along its longitudinal extent, to even out protrusions acting from the outside so well that a virtually uniform clear flow cross section is established in each case in the region of the ferrule acting on the pressure hose. However, although pressure hoses which have a relatively large wall thickness and a relatively small clear flow cross section compared therewith are suitable as high-pressure hoses, they are less suitable for sanitary water conduits through which a possibly also large quantity of water per unit time is intended to flow.

It is known that the flow properties of such a hose arrangement are limited by the internal geometry of the hose nipple, such that the inside diameter of the hose nipple frequently has to be dimensioned in such a way that as little hindrance as possible of the flow arises in the area of application.

SUMMARY

The invention is based on the object of improving the flow properties of a hose arrangement.

In order to achieve this object, provision is made according to the invention, in a hose arrangement of the type mentioned at the beginning, for the ferrule to have profiling produced by crimping of the ferrule, for, as a result of this profiling, an annularly encircling groove to be introduced into the sleeve portion of the ferrule on the outer circumferential side, the groove depth of said groove predefining the height of the protrusion formed on the inner circumferential side, for the protrusion to deform the material of the flexible pressure hose inward such that a constriction is formed, in which the clear inside diameter of the pressure hose assumes a minimum value, and for the constriction to be spaced apart axially from the nipple end in the direction of extent of the pressure hose.

It is advantageous here for a sudden change, necessarily present in the previously known hose arrangements, in the inside diameter at the transition from the hose nipple to the pressure hose to have a smaller step height or to be converted into a more or less smooth transition. As a result, turbulence which previously occurred at the step-like transition and produced an additional reduction in the effective inside cross section provided for the throughflow can be largely or entirely avoided, and so the flow resistance of the hose arrangement can be considerably reduced compared with the known hose arrangements even when the inside diameter of the hose nipple remains the same. This improves the flow properties considerably.

It is particularly favorable for the protrusion to be formed in an encircling manner along the sleeve portion. It is advantageous here for the pressure hose to be displaced radially inward on all sides around its circumference, such that the mentioned step at the wall subjected to an impinging flow, said wall being formed by the hose nipple and pressure hose, can be decreased around the entire circumference or be reduced by smoothing.

The protrusion according to the invention at the projecting ferrule can be formed in a variety of ways, for example by integrally forming a material thickening. One configuration of the invention, which allows particularly easy manufacturing, may provide for the protrusion to be formed by profiling of the sleeve portion. In this case, the sleeve portion has a groove-like depression on the outside, said depression corresponding in terms of depth and extent to the internal protrusion. For example, this configuration allows the protrusion according to the invention to be formed on the ferrule after the ferrule has been placed on the pressure hose and preferably even after the pressure hose has been connected firmly to the hose nipple and the ferrule.

In order to avoid undesired slipping of the hose nipple out of the pressure hose, provision may be made for the hose nipple to have, on the outside, holding ribs by way of which the pressure hose is held on the hose nipple in a form-fitting manner. It is advantageous here for the nipple end to be able to easily maintain a predefined axial distance from the diameter narrowing of the pressure hose. Preferably, the holding ribs extend in each case over the entire circumference of the hose nipple.

In one configuration of the invention, provision may be made for the ferrule to be crimped. It is advantageous here for the ferrule to be easily fastenable to the pressure hose in a slip-resistant manner and for the pressure hose to be able to be held on the hose nipple in a form- or force-fitting manner, so that the ferrule is fixable relative to the hose nipple by way of the protrusion according to the invention.

In order to achieve defined positioning of the protrusion according to the invention with respect to the nipple end of the hose nipple, provision may be made for the hose nipple to have, on the outside, a collar which forms an axial stop for the plugged-on pressure hose and/or the ferrule.

Alternatively or additionally, provision may be made for the ferrule to engage at the end side over the hose end and to form an axial stop for the pressure hose received in the ferrule. It is advantageous here that a defined axial distance of the protrusion according to the invention from the hose end of the pressure hose is thus easily settable, so that the position on the hose arrangement of the diameter narrowing according to the invention of the inside diameter is controllable from the outside.

In order to form a transition which is as smooth as possible between the clear inside diameter of the relaxed, that is to say free, pressure hose and the clear inside diameter, which is decreased compared therewith, of the hose nipple, provision may be made for the protrusion to be arranged on the ferrule such that a region of minimum inside diameter or a constriction of the pressure hose is formed in a manner spaced apart from the nipple end in the direction of extent of the pressure hose. This can be achieved for example in that the axial distance of the protrusion from the hose end in the mounted position of the hose arrangement, that is to say in the use position, is selected to be greater than the axial length of that part of the hose nipple which projects into the pressure hose.

Here and in the rest of the description, the terms "axial" and "radial" are understood with respect to the substantially tubular or cylindrical ferrule and the substantially tubular or cylindrical hose nipple.

Provision may be made for the clear inside diameter of the pressure hose to be reduced in the region of the protrusion to a dimension which is smaller than a minimum outside diameter of the hose nipple. It is advantageous here for the remaining step in the wall, subjected to an impinging flow, of the hose arrangement to be particularly reduced.

The occurrence of eddies can be largely avoided if the protrusion displaces the pressure hose radially inward such that the minimum clear inside diameter of the pressure hose is at most equal to, or even exactly equal to, the inside diameter of the hose nipple.

In one configuration of the invention, provision may be made for the pressure hose to be formed in a single layer. In this case, the layer of the pressure hose can be produced from a composite material or from a homogeneous material. It is advantageous here for the protrusion acting on the outside of the pressure hose to bring about, in a particularly favorable manner, an internal constriction of the clear internal cross section or internal profile of the pressure hose.

BRIEF DESCRIPTION OF THE DRAWINGS

The invention will now be described with reference to an exemplary embodiment, but is not limited to this exemplary embodiment. Further exemplary embodiments result from combining individual features or a number of features of the claims with one another and/or with individual features or a number of features of the exemplary embodiment.

In the drawing:

FIGS. 1A and 1B show a partially cut-away illustration of a hose arrangement according to the prior art (FIG. 1A), as well as an enlarged detail of a portion thereof (FIG. 1B), FIGS. 2A and 2B show a partially cut-away illustration of a hose arrangement according to the invention (FIG. 2A), as well as an enlarged detail of a portion thereof (FIG. 2B), and FIG. 3 an illustration in axial section of the influence of the formation of the protrusion according to the invention on the flow properties of the hose arrangement according to the invention.

DESCRIPTION OF THE PREFERRED EMBODIMENTS

Figure 3:
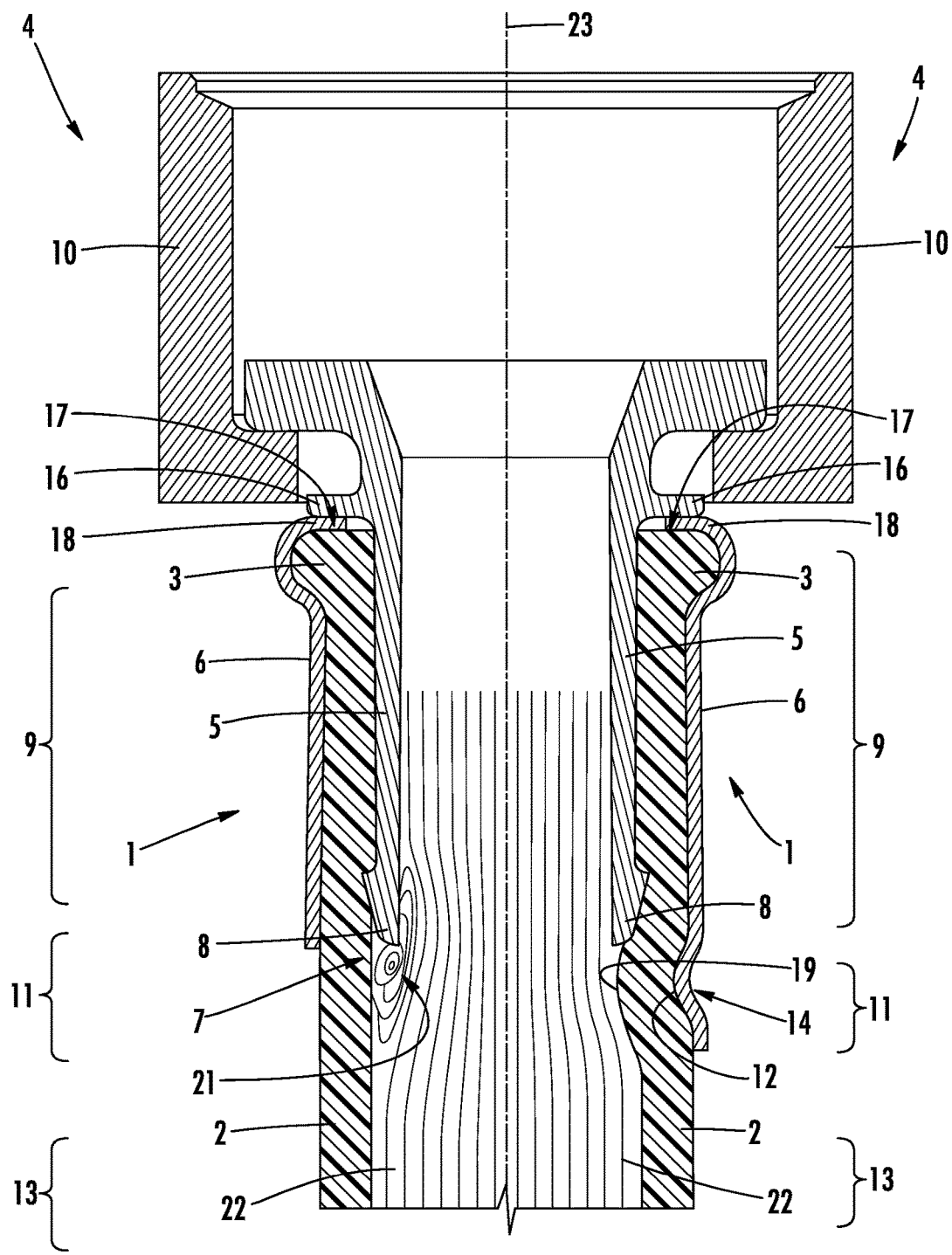

FIGS. 1A and 1B show a hose arrangement, designated as a whole by 1, of a known design.

The hose arrangement 1 has a flexible pressure hose 2, in the case of which a connection piece 4 is fastened to one hose end 3. The connection piece 4 serves for connecting the pressure hose 2 to a water-conducting system which is not illustrated further.

In order to connect the connection piece 4 to the pressure hose 2, the connection piece 4 has a hose nipple 5 and a ferrule 6, which together receive the hose end 3 between one another and hold it in a form-fitting manner.

Since the hose nipple 5 engages in the pressure hose 2, the clear inside diameter of the hose nipple 5 is necessarily smaller than the clear inside diameter of the pressure hose 2, and so a step 7 is formed in the inner wall of the hose arrangement 1 at the axial height of the nipple end 8. The step 7 is illustrated more precisely in a detail enlargement in FIG. 1B.

The ferrule 6 is crimped in a crimping portion 8 spaced apart from the axial ends 24 thereof, and the axial length of the ferrule 6 is selected to be at most so long that the hose nipple 5 is overlapped on the outside by the ferrule 6.

The hose arrangement 1 according to the invention, illustrated in FIGS. 2A and 2B, likewise has a flexible pressure hose 2 and a connection piece 4 fastened to the hose end 3, wherein the connection piece 4 has a hose nipple 5 engaging in the pressure hose 2 and a ferrule 6 engaging around the outside of the pressure hose 2.

The connection piece 4 is illustrated with a connection nut 10 in FIG. 2A for illustrative purposes. In further exemplary embodiments, an external thread or a means for a plug connection, latching connection or screw connection is formed on the connection piece 4, and in particular on the hose nipple 5, for connecting to a water-conveying system.

According to the invention, in the case of the hose arrangement 1 according to FIGS. 2A and 2B, in contrast to the known hose arrangement 1 according to FIGS. 1A and 1B, the ferrule 6 is configured in an extended manner such that it projects axially beyond the hose nipple 5 by way of a sleeve portion 11 at the hose-side nipple end 8 of said nipple in the direction of extent of the pressure hose 2 or along the pressure hose 2.

On the inside, the ferrule 6 forms, in the sleeve portion 11, a protrusion 12 which can be seen in more detail in the detail enlargement in FIG. 2B.

This protrusion 12 is directed radially inward and is formed in an encircling annular manner along the sleeve portion 11.

The protrusion 12 acts radially on the pressure hose 2 in the sleeve portion 11 and thus displaces material of the pressure hose 2 radially inward.

This has the result that the clear inside diameter of the pressure hose 2 in the region of the sleeve portion 11 is reduced compared with the clear inside diameter of the relaxed pressure hose 2, which is present for example in the free hose portion 13. Thus, the clear inside diameter of the pressure hose 2 comes close, in the vicinity of the nipple end 8, to the clear inside diameter of the hose nipple 5 such that the step 7 at the transition from the hose nipple 5 to the pressure hose 2 is considerably reduced in height.

In the exemplary embodiment according to FIGS. 2A and 2B, the protrusion 12 on the ferrule 6 is formed in that the ferrule 6 was profiled. As a result of this profiling, an annularly encircling groove 14 was introduced into the sleeve portion 11 of the ferrule 6, the groove depth of said groove 14 predefining the height of the protrusion 12.

Annularly encircling holding ribs 15 are formed on the outside of the hose nipple 5, said holding ribs 15 digging into the material of the pressure hose 2 and thus preventing the hose nipple 5 from slipping out of the hose end 3.

To this end, the ferrule 6 is crimped in a crimping portion 9 extending as far as the hose-side nipple end 8 of the hose nipple 5, with the result that the pressure hose 2 is pressed radially inward against the holding ribs 15. Since, according to the invention, the ferrule 6 extends beyond the hose nipple 5, the full axial length of the hose nipple 5 is usable for the crimped connection.

The ferrule 6 engages over the hose end 3 at the end side 17 thereof (cf. FIG. 3) and thus forms an axial stop 18 for the hose end 3.

Formed on the outside of the hose nipple 5 is an annularly encircling collar 16 which forms an axial stop for the ferrule 6 and for the pressure hose 2.

Thus, a defined position of the protrusion 12 with respect to the plugged-in hose nipple 5 can be set.

The collar 16 furthermore serves to guide the connection nut 10 when screwing onto a counterpart connection piece.

By way of the protrusion 12, the material of the flexible pressure hose 2 is deformed inward such that a constriction 19 is formed, in which the clear inside diameter of the pressure hose 2 assumes a minimum value.

In this case, the protrusion 12 is positioned so far upstream of the nipple end 8 that the constriction 19 is spaced apart axially from the nipple end 8 in the direction of extent of the pressure hose 2.

As can be seen in more detail in the detail enlargement in FIG. 2B, the constriction 19 forms a flank 20 having a clear inside diameter that decreases continuously toward the nipple end 8, and so, compared with the known prior art according to FIG. 1, the step 7 is smoothed and substantially eliminated. Between the constriction 19 of the clear inner profile and the hose nipple 5, the clear or free internal cross section increases briefly again in the longitudinal direction, and so the profile constriction 19 defines a minimum of the free cross section.

In the exemplary embodiment according to FIGS. 2A and 2B, the clear inside diameter of the pressure hose 2 in the region of the protrusion 12 has not just been reduced to a dimension which is smaller than the minimum outside diameter of the hose nipple 5, rather the protrusion 12 even displaces the pressure hose 2 radially inward in such a way that the minimum clear inside diameter of the pressure hose 2 at the constriction 19 is equal to the inside diameter of the hose nipple 5. Thus, the protrusion 12 does not just project radially into the region of extent of the hose nipple 5, but terminates radially with the inner side of the hose nipple 5.

In the exemplary embodiment, the elevation of the protrusion 12 is depicted particularly well at the constriction 19 in that the pressure hose 2 is formed in a single layer.

FIG. 3 shows the influence of the protrusion 12 according to the invention on the flow properties in the hose arrangement 1 according to FIG. 2A.

In this case, functionally or structurally identical components and features are designated by the same reference signs and are not described again separately.

In FIG. 3, the left-hand half shows the situation which is established without the protrusion 12 according to the invention.

By contrast, the right-hand half represents the flow conditions when a protrusion 12 is formed.

It can be seen in the left-hand half of FIG. 3 that the medium flowing through forms an eddy 21 at the step 7, with the result that the flow lines 22 are displaced radially inward toward the middle 23. As a result, the effective cross section at the transition between the hose nipple 5 and the pressure hose 2 is reduced considerably.

The eddy 21 is formed irrespective of the flow direction, i.e. irrespective of whether the medium is flowing from top to bottom or from bottom to top in the hose arrangement 1 in FIG. 1A.

It can be seen in the right-hand half of FIG. 3 that, due to the protrusion 12 in the ferrule 6, the material of the pressure hose 2 is displaced radially inward, with the result that a constriction 19 of the inside diameter and thus of the clear inner profile is formed on the inside of the pressure hose 2 in the immediate vicinity of the nipple end 8.

This profile constriction 19 creates a smoothed transition between the hose nipple 5 and the relaxed pressure hose 2 which is present in the free hose portion 13.

Due to this smoothed transition, the step 7 is virtually completely eliminated, and so essentially no eddies 21 occur, but rather the flow lines 22 indicate a substantially unimpeded laminar flow.

In this way, the clear inside diameter provided by the hose nipple 5 can be optimally utilized, and the flow resistance of the hose arrangement 1 is considerably reduced compared with the situation without a protrusion 12 according to the invention (left-hand half of the image).

In the case of the hose arrangement 1 for a water-conveying system, said hose arrangement 1 having a flexible pressure hose 2 and a connection piece 4 having a hose nipple 5 and a ferrule 6 which receive the pressure hose 2 between one another, it is proposed that the ferrule 6 has, in a sleeve portion 11 projecting axially beyond the hose nipple 5, an inwardly projecting protrusion 12 by way of which the pressure hose 2 is displaced radially inward behind the hose nipple 5 so as to form a constriction 19 of the inside diameter, such that the transition of the inside diameter between the hose nipple 5 and the pressure hose 2 is smoothed.

The invention claimed is:

1. A hose arrangement (1) for a water-conveying system, comprising a flexible pressure hose (2) and a connection piece (4) arranged on one hose end (3) of the pressure hose (2), the connection piece (4) has at least one hose nipple (5) which engages in the pressure hose (2), and a ferrule (6) which engages around an outside of the pressure hose (2), the pressure hose (2) is held in at least one of a force or form-fitting manner between the hose nipple (5) and the ferrule (6), the ferrule (6) includes a sleeve portion (11) that projects beyond the hose nipple (5) at a hose-side nipple end (8) of said nipple in a direction of extent of the pressure hose (2), and the ferrule (6) includes, in the sleeve portion (11), a radially inwardly directed protrusion (12) which acts radially on and displaces the pressure hose (12) such that, compared with a clear inside diameter of the relaxed pressure hose (2), an inside diameter of the pressure hose (2) in a region of the sleeve portion (11) that extends past the hose-side nipple end (8) is equal to an inside diameter of the hose nipple (5), the ferrule (6) has profiling produced by crimping of the ferrule (6), and as a result of said profiling, an annularly encircling groove (14) is introduced into the sleeve portion (11) of the ferrule (6) on an outer circumferential side in an area past the hose-side nipple end (8), a groove depth of said groove (14) predefining a height of the protrusion (12) formed on an inner circumferential side, and the protrusion (12) deforms the material of the flexible pressure hose (2) inward such that a constriction (19) is formed, in which the inside diameter of the pressure hose (2) assumes a minimum diameter, and the constriction (19) is located adjacent to and spaced apart axially from the nipple end (8) in the direction of extent of the pressure hose (2), wherein the inside diameter of the pressure hose (2) is reduced in a region of the protrusion (12) to a dimension which is smaller than a minimum outside diameter of the hose nipple (5) and wherein the hose-side nipple end (8) and the constriction (19) have a gap therebetween and wherein the constriction (19) has an apex which is convex from the apex to the hose-side nipple end (8) and is convex in the opposite longitudinal direction, from the apex, to a portion past the ferrule(6).

2. The hose arrangement (1) as claimed in claim 1, wherein the protrusion (12) is formed in an encircling manner along the sleeve portion (11).

3. The hose arrangement (1) as claimed in claim 1, wherein the protrusion (12) is formed by profiling of the sleeve portion (11).

4. The hose arrangement (1) as claimed in claim 1, wherein the hose nipple (5) has, on an outside, holding ribs (15) by which the pressure hose (2) is held on the hose nipple (5) in a form-fitting manner.

5. The hose arrangement (1) as claimed in claim 1, wherein the ferrule (6) is crimped.

6. The hose arrangement (1) as claimed in claim 1, wherein the hose nipple (5) has, on an outside, a collar (16) which forms a stop for at least one of the plugged-on pressure hose (2) or the ferrule (6).

7. The hose arrangement (1) as claimed in claim 1, wherein the ferrule (6) engages at an end side over the hose end (3) and forms a stop (18) for the pressure hose (2) received in the ferrule (6).

8. The hose arrangement (1) as claimed in claim 1, wherein the protrusion (12) is arranged on the ferrule (6) such that a region of minimum inside diameter of the constriction (19) of the pressure hose (2) is formed in a manner spaced apart from the nipple end (8) in the direction of extent of the pressure hose (2).

9. The hose arrangement (1) as claimed in claim 1, wherein the pressure hose (2) is formed in a single layer.

* * * * *